INVENTOR.
ADRIAN O. ABBOTT, JR.
BY
ATTORNEYS.

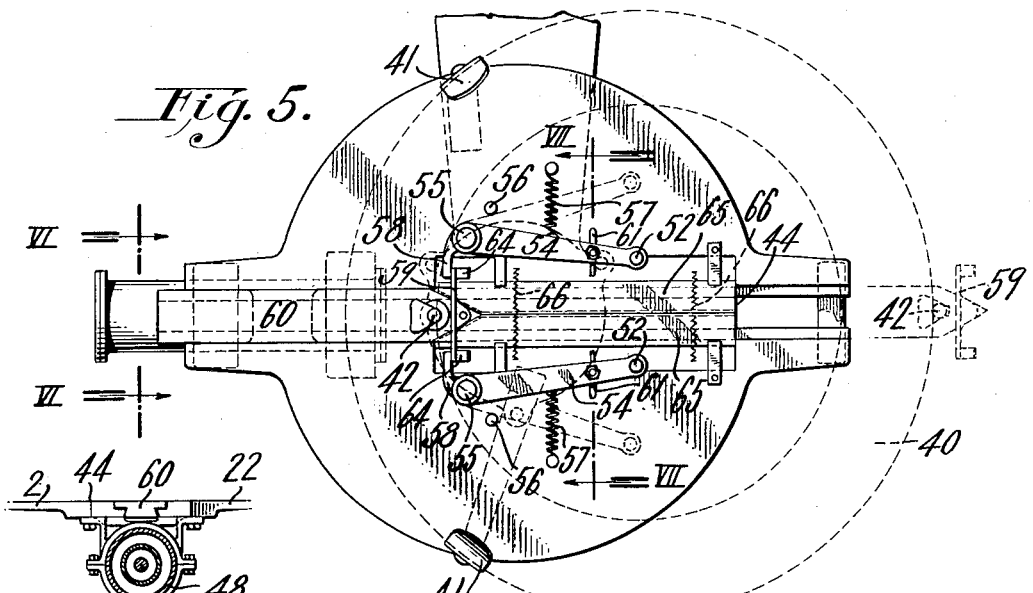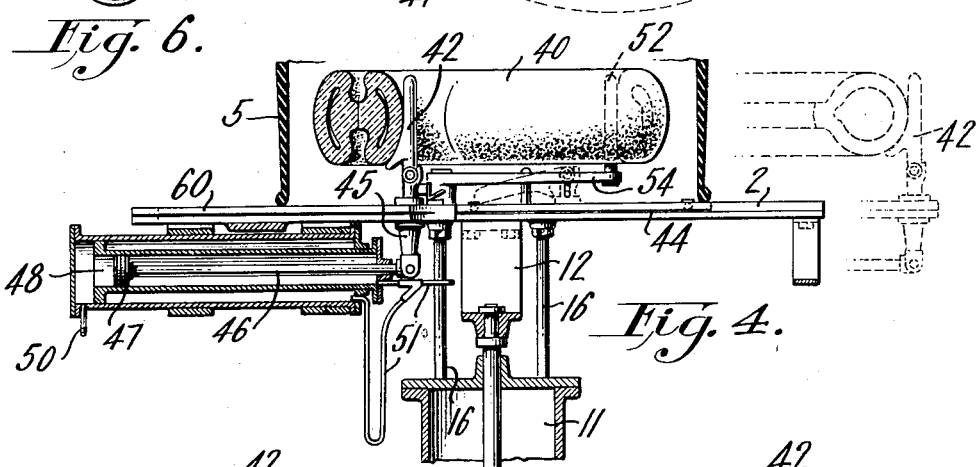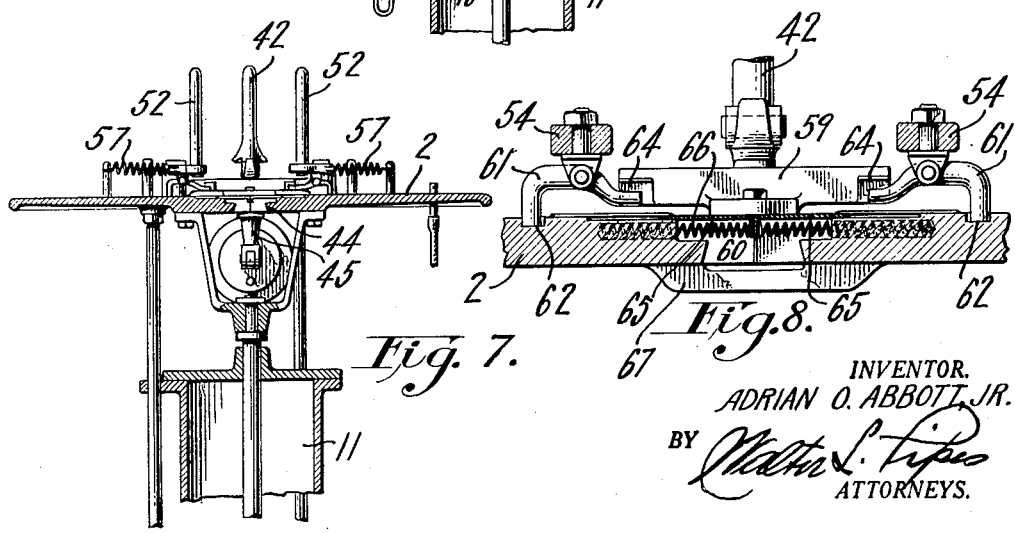

Patented Mar. 6, 1934

1,949,443

UNITED STATES PATENT OFFICE 1,949,443

TIRE SHAPING APPARATUS

Adrian O. Abbott, Jr., Grosse Pointe Park, Mich., assignor to Morgan & Wright, Detroit, Mich., a corporation of Michigan Application December 12, 1930, Serial No. 501,800

18 Claims. (Cl. 18—4)

My invention relates to tire shaping apparatus and more particularly to apparatus for changing the shapes of "pulley band" tires to their final contour, and for simultaneously inserting shaping bags to be used in a subsequent vulcanizing operation.

In the manufacture of tires by the so-called flat or "pulley band" process, the shape of a tire is changed from the pulley band shape to the final tire configuration by subjecting it to a squeezing action which involves lateral pressure imparted by plates moving axially of the band and engaging the band edges to complete a substantially fluid tight chamber. A pressure differential is applied between the inner and outer surfaces of the tire for giving it its final shape. Where such tires are shaped without the insertion of a curing bag for maintaining the tires under pressure when they are subsequently inserted in a vulcanizing or curing mold, it has required considerable manual effort to buckle the bags and insert them in the tires. Frequently such operations have been carried on at separate localities thereby requiring a considerable number of operators and unnecessary handling of the tires and bags.

I provide a mechanism in which the pulley bands are shaped and the bags are inserted simultaneously with the shaping operation. The collapsing of the bags is performed by pneumatically operated devices after the bags are placed upon one of a number of moving supports for such collapsed bags and the unshaped pulley bands. Provision is also made for removing the shaped tires and bags and delivering them to a conveyor. Curing molds may be carried on the conveyor so that the shaped tires and enclosed bags may be delivered directly to the molds. The entire mechanism is substantially automatic and is under the control of a single operator whose only duty is to apply bands and bags to successive supports. Certain of the features of the present invention are closely related to the subject matter of my copending application Serial No. 465,109, filed July 1, 1930.

The accompanying drawings illustrate a present preferred embodiment of the invention, in which Figure 1 is a plan view of a tire shaping apparatus;

Fig. 3 is a diagrammatic view of the tire engaging and gripping devices taken substantially along the section line III—III of Fig. 2;

Fig. 4 is a sectional elevational view of the bag collapsing mechanism;

Fig. 5 is a plan view thereof;

Fig. 6 is a cross sectional view of a telescoping cylinder used in the collapsing mechanism, taken substantially along the section line VI—VI of Fig. 5;

Fig. 7 is a sectional view of the collapsing mechanism taken at substantially right angles to the view of Fig. 4, and substantially along the section line VII—VII of Fig. 5; and Fig. 8 is an enlarged elevational view of details of the collapsing mechanism.

Figure 1:
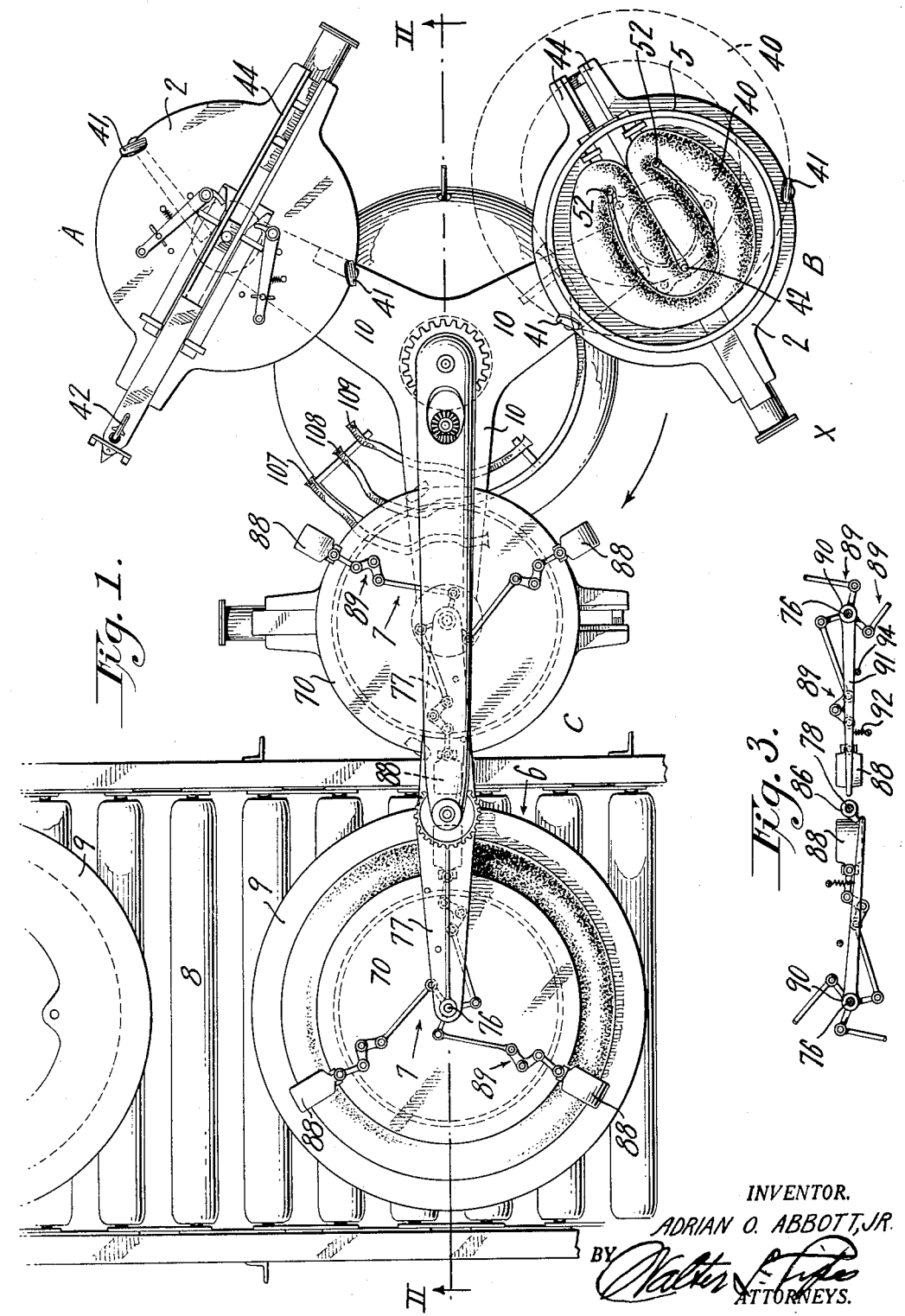

Referring to the drawings, the tire shaping and bag inserting mechanism comprises in general a primary turret 1 which carries a plurality of supports or tables 2 having mechanisms 4 for collapsing shaping or curing bags within a pulley band 5; together with a secondary turret 6 having a plurality of devices 7 successively co-operating with the several supports 2 for imparting tire shapes to the several pulley bands, and releasing the curing bags within them. Thereafter the devices on the secondary turret remove the shaped tires and bags from the supports 2 and deliver them to a conveyor 8 on which sections of tire molds 9 may be carried.

The primary turret 1 comprises a plurality of arms 10 each of which terminates in a vertically extending cylinder 11 for actuating a support 2 by means of a bracket 12, a piston rod 14 and a piston 15. Guide rods 16 carried by each of the supports 2 extend through openings 17 in flanges on the cylinders 11 for preventing rotation of the supports as they are raised and lowered by movement of the pistons 15. Each cylinder is connected to a valve 18 for admitting fluid under pressure to the lower end of the cylinder by a pipe line 19 and to the upper end thereof by a pipe line 20. As the details of the several units are similar, but a single unit is hereafter described in detail, although it is to be understood that the number of supports 2 and arms 10 may be varied as desired.

The arms 10 are connected to a common hub 21 extending through an opening 22 in a base 24. The hub 21 is supported in a vertical position by roller bearing 25 and 26. The center of the hub is hollow and there extends therethrough a shaft 104, the portion within the hub being provided with a passageway 27. The lower end of the shaft 104 terminates in a joint 28 connected to a pipe line 29 at the bottom of the hub 21. This construction provides a passageway for fluid under pressure from the pipe line 29 to a series of passageways 30 and pipe lines 31 which communicate with the several valves for actuating the apparatus carried on each of the arms 10. It is to be understood that the number of units of valves and the number of pipe lines 31 correspond to the number of the arms 10.

The mechanism is actuated from a motor 32 connected through a reducing gear 34 and a shaft 35 to a bevel gear 36 within the base 24. The bevel gear 36 meshes with a gear 37 on a clutch sleeve 38 rotatable about the hub 21. A second clutch sleeve 39 is splined or keyed to the hub and is connected with a yoke 40', preferably controlled by the foot of an operator, to bring the sleeves 38 and 39 into engagement for rotating the turret. The direction of rotation of the turret is shown by the arrow in Fig. 1.

*Bag collapsing mechanism*

The support 2, shown in position A in Fig. 1 illustrates the bag collapsing mechanism in its fully extended position. The mechanism remains in the position illustrated until it reaches substantially the position B during the rotation of the turret. The operator applies a curing bag 40 to the collapsing mechanism 4, as indicated in dotted lines in Figs. 1 and 5.

The bag 40 is inserted between a plurality of pivotally mounted arms 41 carried by the support 2 and a hinged post 42 which extends through and is movable in an opening 44 in the support 2. The post 42 is mounted on a post 45 which slides in a guide in the edges of the opening 44. The post 45 is connected to a piston rod 46 attached to a piston 47 operating in a telescoping cylinder 48. The cylinder 48 is mounted on the support 2 in such position that it and the piston rod 46 may move between the legs of the bracket 12. The ends of the cylinder 48 are connected to a valve 49 by pipe lines 50 and 51. The pipe line 50 is illustrated as being connected to a stationary end of the cylinder, and the pipe line 51 is connected to the movable end of the cylinder 48 and comprises two branches to control the collapsing of the telescoping cylinder.

Accordingly, when the valve 49 is actuated by the movement of the turret, as hereinafter described, to admit fluid to the pipe line 51, and an extended bag is in the dotted line position, as indicated in Figs. 1, 4 and 5, the post 42 is moved to the left, as illustrated in the drawings, to collapse the bag between it and the arms 41.

The curing bag 40 is collapsed about a pair of pins 52 which subsequently serve to hold the bag in its collapsed position by pinching its reentrant portions together, as illustrated at position B in Fig. 1. For this purpose, each of the pins 52 is mounted on a lever 54 movable about a pivot 55 to a position controlled by a stop 56, as indicated in dotted lines in Fig. 5. A spring 57 normally urges each of the levers 54 into an outward position. Each of the levers 54 is provided with a tail-piece 58 which engages a crossbar 59 on a slide 60 movable with the posts 42 and 45 in the slot 44. During the collapsing movement of the cylinder 48, the crossbar 59 engages the tailpieces 58 to turn the levers 54 into the full line positions shown in Fig. 5, for securing the collapsed bag in place. Latches 61 carried by the levers 54 engage detents 62 in the support 2 for holding the levers against the springs 57.

The levers 54 are subsequently released by cam surfaces 64 carried by the crossbar 59 riding over the tail-pieces of the latches and withdrawing them from the detents 62, upon the return movement of the slide 60, as hereinafter described. For closing that part of the opening 44 which is not covered by the slide 60, shutters 65 are slidably mounted adjacent the edges of the openings. These shutters are normally urged into their opening closing positions by springs 66 embedded in the support 2 adjacent the edges of the opening 44. The shutters 65 serve to render the support 2 substantially fluid tight, for a purpose hereinafter described. The opening 44 is spanned by a plurality of crosspieces 67 which prevent relative movement between the portions of the support 2.

It is to be understood that the expanded bag is placed upon each support 2 at substantially position B of Fig. 1, and that the collapsing of the bag takes place progressively as the support 2 moves from the position B to the position C, Fig. 1, and that during this movement the pulley band 5 is placed around the collapsed bag 40 by the operator.

*Tire shaping operation*

For changing the cylindrical pulley band into tire shape, the devices 7 are successively brought into co-operation with the supports 2 by elevating the latter. Upon elevation of the supports 2, the pulley bands 5 are subjected to axial pressure between a support 2 and a plate 70 constituting a portion of one of the devices 7. The axial pressure tends to bulge the pulley band into tire shape. This bulging movement is assisted by the admission of fluid under pressure within the chamber formed by the pulley band 5, the support 2 and the plate 70, through a pipe line 71 controlled by a valve 72. The valves 18, 49 and 72 are cam operated valves which are controlled by the movement of the turret, as hereinafter explained.

During the upward movement of the support 2, brackets 74 are pulled away from in front of counterweights 75 on the arms 41 so that the latter may swing out of the way of the bulging tire. The relative positions of the parts at the beginning of a shaping operation are shown in full lines in Fig. 2, and the final shaping positions of the support 2, tire and bag are shown in dotted lines.

Each device 7 comprises the plate 70 which is preferably of circular outline having a diameter slightly in excess of the diameter of the pulley band 5. The plate is suspended by a post 76 from an arm 77 of the secondary turret 6. The connections between the arm 77, the post 76 and the plate 70 are fixed so that the plate 70 remains in a definite angular position relative to the arm 77. As illustrated, there are two arms 77 on the secondary turret 6, so that the arms 77 may be rotated substantially 180° upon each operation of the turret. However, it is to be understood that the number of arms may be varied if desired. The amount of rotation of each turret arm upon each actuation of the secondary turret 6 may also be varied.

The arms 77 are suspended from a post 78 which extends through a sleeve 79 carried by an overhanging frame member 80. The upper end of the post 78 is provided with a collar 81 and a nut 82 bearing against the frame member 80. The sleeve 79 is provided with an enlarged head 84 seating in the frame member 80. The lower end of the post 78 is provided with a collar 85 and a cam 86. The post 78 and the cam 86 are held in a fixed relation relative to the frame member 80.

The hub for the several arms 77 bears upon the collar 85 and is free to turn around the sleeve 79. A bevel gear 87 is mounted on the sleeve 79 between the frame member 80 and the hub for the arms 77 to which it is rigidly secured, for a purpose hereinafter described.

Each of the devices 7 is provided with means for engaging the shaped tire and removing it from the co-operating support 2. This means comprises a plurality of hooks 88 which are pivotally mounted on the plate 70. Each of the hooks is connected through a link and bell crank mechanism 89 to a sleeve 90 rotatably mounted on the post 76, as shown diagrammatically in Fig. 3. The sleeve 90 has secured thereto a lever arm 91 which extends into cooperative engagement with the cam 86 as the levers are rotated thereabout. A spring 92 normally holds each lever 91 against a stop 94 so that the hooks 88 are normally held in their closed or tire engaging positions.

Accordingly, when a pulley band 5 is shaped by the movement of a support 2 toward a plate 70, the shaped tire is brought into such engagement with the hooks 88 that it is thereafter supported by the hooks.

Rotation of turret 6

For rotating the secondary turret 6 and to bring the devices 7 into registry with the supports 2 for tire shaping operations, the bevel gear 87 meshes with a bevel gear 95 which is actuated by a shaft 96. The shaft 96 terminates in a bevel gear 97 within the frame member 80. The bevel gear 97 meshes with a bevel gear 98 mounted on a vertically extending shaft 99 supported by the frame member 80. The lower end of the shaft 99 carries a gear 100 which meshes with a gear 101 carried at the top of the hub 21 so that the secondary turret 6 is rotatable in synchronism with movement of the hub 21. Preferably, the gear ratio between the hub 21 and the gear 87 is such that the movement of the hub 21 necessary to bring the support 2 into registry with a device 7 is such as to cause 180° movement of the arms 77 of the secondary turret 6.

The relative movement between the frame member 80 and the hub 21 is eased by roller bearings 102 supported on the end of the hub 21. The frame member 80 is also supported by a stationary shaft 104 which extends from a ceiling support 105 through the hub 21 to the coupling 28 and is stationary. The lower portion of the shaft 104 contains the passageway 27. The frame member 80 is secured to the shaft 104 by a pin 106 to prevent its rotation.

Accordingly, as the hub 21 is rotated the arms of the secondary turret are turned about the cam 86 to actuate the levers 91 successively. The cam 86 is positioned on the shaft 78 so that its high spot trips the levers 91 when the successive devices 7 are above the conveyor 8 onto which the tires and bags are discharged.

Valve operating mechanism

Figure 2:
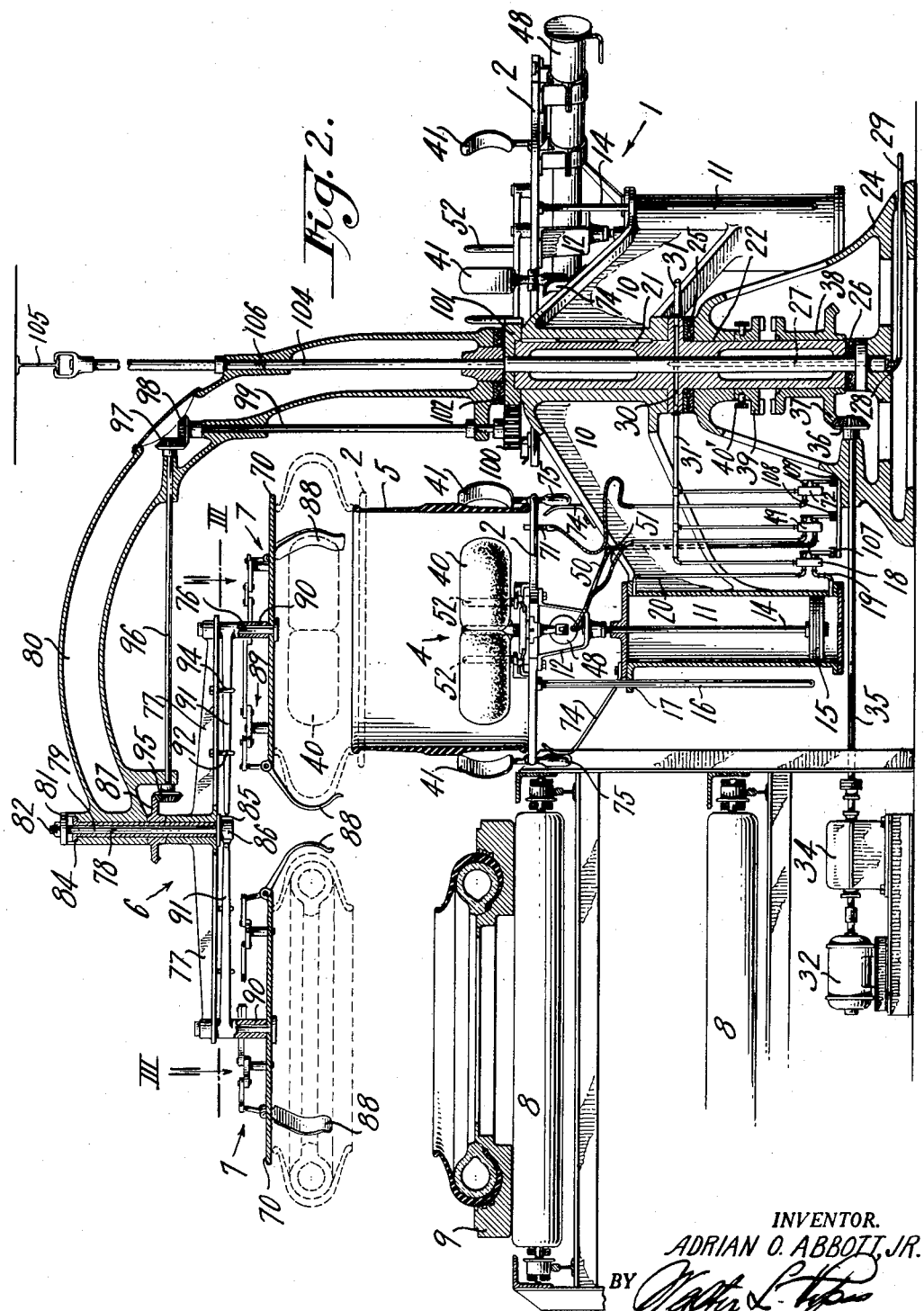
Fig. 2 is a transverse view thereof partly in elevation and partly in section, taken substantially along the section line II—II of Fig. 1.

Referring particularly to Figs. 1 and 2, the several valves 18, 49 and 72 are controlled in accordance with the movement of the hub 21 by cam tracks 107, 108 and 109, respectively. The cam tracks are mounted on the base 24 so that the valve group associated with each of the arms 10 travels over the same cam paths and thereby performs the same sequence of operations. The cam track 108 which controls the valve 49 is considerably longer than the cam tracks 107 and 109 to insure that the bag 40 shall be collapsed and to afford the operator an opportunity to place a band 5 about the collapsed bag before it is brought into registry with one of the devices 7.

Operation of the apparatus

In the cycle of operations of any support 2, it is first in the position A of Fig. 1 with the post 42 in a collapsed position. As there is no cam track on that portion of the base 24 adjacent the position A, there is no actuation of the parts except the rotary motion of the arm 10. While the support 2 is in this inactive position the operator raises the post 42. As the entire movement of the apparatus is under the control of the operator through the medium of the clutch yoke 40', the operator can control the movements of the supports 2 between the several positions A, B and C, at will. It is also to be observed that no relative change of the parts upon any support 2 takes place unless the support is in motion to cause the cam tracks 107, 108 and/or 109 to operate their associated control valves.

The first movement imparted to the turret by the connection of the clutch sections 38 and 39 causes the support to move from the position A to the position B where the operator places a bag 40 between the post 42 and the arms 41. At this position the cam track 108 engages the valve 49 for admitting fluid under pressure to the pipe line 51, thereby causing the post 42 to be moved to the left of Fig. 4, for collapsing the bag 40. During the collapsing movement the pins 52 are brought into engagement with the reentrant portions of the bag and secured by the latches 61. As soon as the slide 60 has moved out of the way of the shutters 65 they automatically close the opening 44 in the support 2 thereby rendering the latter substantially fluid tight.

After the bag 40 is completely collapsed, the operator, indicated by X in Fig. 1, places the pulley band around the bag. Preferably the bags and pulley bands are brought within reach of the operator by conveyors not shown, or they may be delivered to the operator by trucks or the like. As has previously been pointed out, the complete collapsing of the bag 40 does not take place exactly at the station B but is a progressive movement which takes place as the support 2 moves between the positions B and C. For the purpose of illustration, the collapsed bag has been shown as though it were in a stationary position. The valve 49 is closed as the support reaches the position C.

As the support reaches the position C, the valve 18 is actuated by the cam track 107 to permit fluid under pressure to traverse the pipe line 19 to the cylinder 11. The operator then stops the turret with the support C in registry with one of the devices 7 as the support 2 is raised by the piston 15. During the upward movement of the support 2 the arms 41 are freed as previously described. When the pulley band 5 engages the plate 70 it completes a chamber into which fluid under pressure is admitted by the valve 72. When the tire is shaped from the full line position to the dotted line position illustrated in Fig. 2, the operator again starts the turret 1 to rotate, which operates valve 18 to quickly lower the support 2 away from the plate 70 on which the tire is retained. At the same time the valve 72 is closed.

As the support 2 begins to move away from the position C, fluid under pressure is admitted to the cylinder 48 through the pipe line 50 which causes the slide 60 to move to the right, as viewed in Figs. 4 and 5. This movement causes the separation of the shutters 65 by reason of their sloping ends and a tapered end on the slide 60. At the same time the friction of the bag 40 on the post 42 causes the latter to collapse. As the slide 60 advances, the latches 61 are released by the cam surfaces 64 on the crosspiece 59. This permits the arms 54 to spring outwardly under the tension of springs 57, thereby releasing the bag 40 so that it expands into the shaped tire due to its own resiliency. This operation takes place before the support 2 has moved downwardly far enough to carry the collapsed bag 40 out of the periphery of the shaped tire so that the expanded bag is supported by the shaped tire. The downward movement of the support 2, however, is sufficiently rapid to permit the collapsed arm 42 to slide under the toe of the shaped tire. The support 2 then moves to the position A as the following support is brought into registry; with one of the devices 7.

As the turret 1 begins to turn to remove the support 2 from registry with the device 7, the plate 70 of the latter begins to rotate. The rotary motion of the arms 70 is in the same direction as the rotary motion of the plates 2. The friction between the shaped tire supported by the hooks 88 and the receding support 2 is minimized and time is also given for the release of the bag. During the time that a subsequent support is being brought into the tire shaping position the device 7 carrying the shaped tire rotates through substantially 180° until the shaped tire and bag are over the conveyor 8 when the hooks 88 are expanded by the engagement of the high spot of cam 86 with the lever 91 co-operating with the hooks. If desired, a mold section 9 may be positioned on the conveyor to receive the shaped tire and bag thereby eliminating a separate operation for placing the tire in a mold section.

While I have shown and described a present preferred embodiment of my invention, it is to be understood that it may be otherwise embodied within the spirit of the invention and the scope of the appended claims.

Having thus described my invention, what I claim and desire to protect by Letters Patent is:

1. In tire shaping apparatus, a movable support for a tire band and a shaping bag, means for collapsing the shaping bag carried by said support, and means co-operating with said support for shaping a tire band.

2. In tire shaping apparatus, a movable support for a tire band and a shaping bag, means for collapsing the shaping bag carried by said support, and movable means co-operating with said support for shaping the tire band.

3. In tire shaping apparatus, a movable support for a tire band and a shaping bag, means for collapsing the shaping bag carried by said support, and means co-operating with said support for shaping the tire band, said co-operating means comprising means for securing and removing the shaped tire from said support.

4. In tire shaping apparatus, a conveyor, a movable support for a tire band and a shaping bag, means for collapsing the shaping bag carried by said support, and means co-operating with said support for shaping the tire band, said co-operating means comprising means for transferring the shaped tire band and bag to said conveyor.

5. In tire shaping apparatus, a plurality of movable supports for tire bands and shaping bags, and co-operating shaping means comprising a plurality of movable devices for seizing shaped tire bands and bags contained therein and for removing them from said supports.

6. In tire shaping apparatus, a conveyor, a plurality of movable supports for tire bands and shaping bags, and co-operating shaping means comprising a plurality of movable devices for seizing shaped tire bands and bags contained therein, removing them from the supports and transporting them into positions for delivery to said conveyor.

7. In tire shaping apparatus, a primary turret, a plurality of supports for tire bands and shaping bags mounted thereon, and a secondary turret having a plurality of co-operating devices for shaping said bands about said bags and for removing them from said supports.

8. In tire shaping apparatus, a conveyor, a primary turret, a plurality of supports for tire bands and shaping bags mounted thereon, and a secondary turret having a plurality of devices co-operating with said supports for shaping the bands about the bags and for removing the shaped bands and bags from the supports for delivery to said conveyor.

9. In tire shaping apparatus, a primary turret having a plurality of supports for tire bands and shaping bags and separately operable means for elevating the several supports, and a secondary turret having means co-operating with said supports for shaping the tire bands upon the elevation of said supports.

10. In tire shaping apparatus, a base, a plurality of movable supports for tire bands and shaping bags mounted on said base, fluid operated means for actuating said supports, and a cam track mounted on said base for controlling the sequence of operation of the several supports during their movement relative to said base.

11. In tire shaping apparatus, a support for a tire band and shaping bag, means for collapsing said shaping bag comprising an element projecting through an opening in said support, a fluid tight shaping member for closing the opening in said band opposite said support, means for supplying fluid under pressure, and means for closing said opening in said support to render said support substantially fluid tight.

12. In tire shaping apparatus, a support for a tire band and shaping bag, means for collapsing said shaping bag comprising an element projecting through an opening in said support, a fluid tight shaping member for closing the opening in said band opposite said support, means for supplying fluid under pressure, and shutters for closing said opening to render said support substantially fluid tight.

13. In tire shaping apparatus, a revolvably mounted plate, means carried by said plate for engaging and gripping a shaped tire band, and a cam operated mechanism responsive to the movement of said plate for controlling said engaging and gripping means.

14. In tire shaping apparatus, a revolvably mounted support, a stationary shaft for said support, a cam mounted on said shaft, a plurality of plates carried by said support, means carried by said plates for engaging and seizing a shaped tire band, and means for actuating said engaging and seizing means comprising a member engageable with said cam during the rotation of said support.

15. In tire shaping apparatus, a revolvably mounted support, a fixed shaft therefor, a cam mounted on said shaft, and a plurality of tire engaging and seizing devices mounted on said support, and each comprising a member co-operating with said cam for causing said devices when in certain positions to support a shaped tire band and when in other positions to discharge the band.

16. In tire shaping apparatus, a series of moving supports for tire bands and shaping bags, a series of movable devices co-operating therewith for successively shaping said bands about said bags and removing the shaped bands and bags from said supports, and means for actuating and synchronizing the movements of said supports and devices.

17. In tire shaping apparatus, a series of moving supports for tire bands and shaping bags, a series of movable devices co-operating therewith for successively shaping said bands about said bags and removing the shaped bands and bags from said supports, a common source of power, and means for connecting said supports and devices to said source of power and for synchronizing their movements.

18. In tire shaping apparatus, a conveyor, a support for a tire band and shaping bag, means co-operating with said support for shaping the band about the bag and for transferring them to position for delivery to the conveyor, and means for automatically releasing the band and bag when in position to be delivered to said conveyor. ADRIAN O. ABBOTT, Jr.